(12) United States Patent
Ladouceur et al.

(10) Patent No.: US 8,811,032 B2
(45) Date of Patent: Aug. 19, 2014

(54) HANDHELD ELECTRONIC DEVICE HAVING A FLEXIBLE DISPLAY

(75) Inventors: Norman Miner Ladouceur, Waterloo (CA); Jason Tyler Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 239 days.

(21) Appl. No.: 13/198,947

(22) Filed: Aug. 5, 2011

(65) Prior Publication Data

US 2013/0033844 A1 Feb. 7, 2013

(51) Int. Cl.
*H05K 7/00* (2006.01)

(52) U.S. Cl.
USPC ............... 361/807; 361/679.06; 361/679.11; 361/679.3; 361/679.13; 361/749

(58) Field of Classification Search
USPC ............... 361/679.06, 679.11, 679.13, 679.3, 361/749, 807
See application file for complete search history.

(56) References Cited

U.S. PATENT DOCUMENTS

| | | | |
|---|---|---|---|
| 6,016,176 A | 1/2000 | Kim et al. | |
| 6,332,084 B1 * | 12/2001 | Shaanan et al. | 455/566 |
| 6,577,496 B1 | 6/2003 | Gioscia et al. | |
| 6,688,528 B2 | 2/2004 | Silverbrook | |
| 7,019,985 B2 | 3/2006 | Lefort | |
| 7,095,387 B2 | 8/2006 | Lee et al. | |
| 7,187,363 B2 * | 3/2007 | Nguyen et al. | 345/168 |
| 7,388,578 B2 * | 6/2008 | Tao | 345/173 |
| 7,558,057 B1 | 7/2009 | Naksen et al. | |
| 7,714,801 B2 | 5/2010 | Kimmel | |
| 7,787,917 B2 | 8/2010 | Aoki et al. | |
| 2003/0104850 A1 | 6/2003 | Lai et al. | |
| 2004/0046739 A1 * | 3/2004 | Gettemy | 345/158 |
| 2005/0132292 A1 | 6/2005 | Nien | |
| 2005/0164752 A1 | 7/2005 | Lau et al. | |
| 2007/0052832 A1 | 3/2007 | Bae et al. | |
| 2007/0097014 A1 * | 5/2007 | Solomon et al. | 345/1.1 |
| 2008/0158163 A1 | 7/2008 | Ladouceur et al. | |
| 2009/0021666 A1 | 1/2009 | Chen | |
| 2009/0051830 A1 | 2/2009 | Matsushita et al. | |
| 2009/0109131 A1 | 4/2009 | Wang et al. | |
| 2009/0153491 A1 * | 6/2009 | Moosavi | 345/172 |

(Continued)

FOREIGN PATENT DOCUMENTS

| | | |
|---|---|---|
| EP | 1713236 A1 | 10/2006 |
| JP | 5130035 A | 5/1993 |
| WO | WO2007005506 A1 | 1/2007 |

OTHER PUBLICATIONS

Wikipedia, "Electronic Paper", Jan. 31, 2010.*

(Continued)

*Primary Examiner* — Anatoly Vortman
*Assistant Examiner* — Jacob Crum
(74) *Attorney, Agent, or Firm* — Finnegan, Henderson, Farabow, Garrett & Dunner LLP

(57) ABSTRACT

A handheld electronic device includes a housing, a flexible display associated with the housing, and an input portion linked to the flexible display. The input portion is movable relative to the housing between a first position and a second position. The flexible display has a first viewing area when the input portion is in the first position and a second viewing area when the input portion is in the second position. The second viewing area is smaller than the first viewing area.

5 Claims, 10 Drawing Sheets

(56) References Cited

U.S. PATENT DOCUMENTS

2009/0156264 A1    6/2009  Cho et al.
2009/0233660 A1*   9/2009  Demuynck ............... 455/575.4
2010/0117975 A1    5/2010  Cho

OTHER PUBLICATIONS

Extended European Search Report dated Oct. 25, 2011, issued in European Application No. 11176714.1-2224 (5 pages).

* cited by examiner

HANDHELD ELECTRONIC DEVICE HAVING A FLEXIBLE DISPLAY

FIELD

This disclosure relates generally to handheld electronic devices and, more particularly, to handheld electronic devices having a flexible display.

BACKGROUND INFORMATION

Numerous types of handheld electronic devices are known. Examples of such handheld electronic devices include, for instance, personal data assistants (PDAs), handheld computers, two-way pagers, mobile telephones, and the like. Some handheld electronic devices feature wireless communication capabilities. Other handheld electronic devices are stand-alone devices that are functional without communication with other devices.

A typical handheld electronic device has a display supported by a housing. The display is generally a non-flexible component having fixed physical dimensions. In addition to the display, a typical handheld electronic device also includes a user interface area having a keyboard, keypad, touchpad, gamepad, touchscreen, or a combination of such input devices.

Certain applications benefit from either a larger display area or a larger user interface area. Accordingly, some handheld electronic devices are designed to cover and uncover all or portions of the display. Other handheld electronic devices are designed to slide or flip open to uncover all or portions of the user interface area. These designs require the exterior dimensions of the device to change in order to provide a user access to a desired display area or a desired user interface area. While these designs have been generally effective for their intended purposes, the physical dimensions of the display limit the design of the handheld electronic device.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
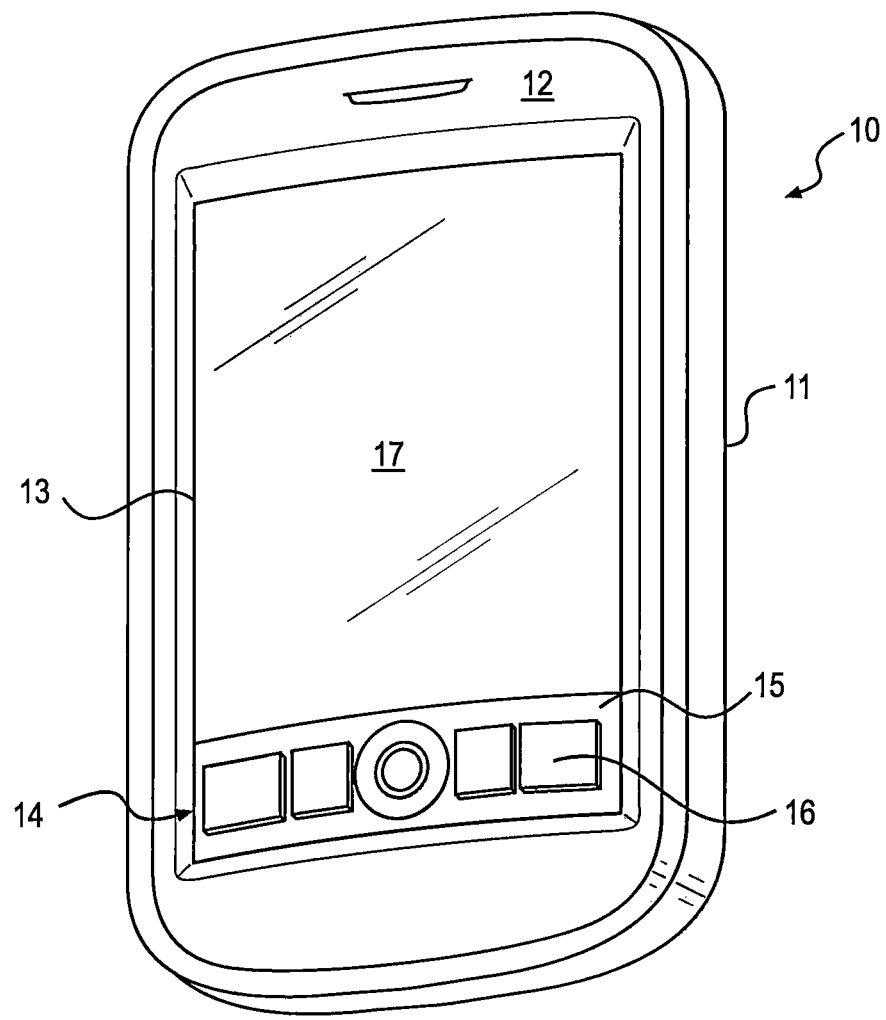
FIG. 1 is a perspective top view of a handheld electronic device having an input portion in a first position, consistent with disclosed embodiments.

Reference will now be made in detail to exemplary embodiments, examples of which are illustrated throughout the drawings. Wherever possible, the same reference numbers are used in the drawings and the description to refer to the same or like parts.

The disclosure generally relates to a handheld electronic device. Examples of handheld electronic devices include mobile wireless communication devices such as pagers, mobile phones, mobile smart-phones, wireless organizers, personal digital assistants, wireless-enabled notebook computers, and any other known communication device having a keypad.

Figure 2:
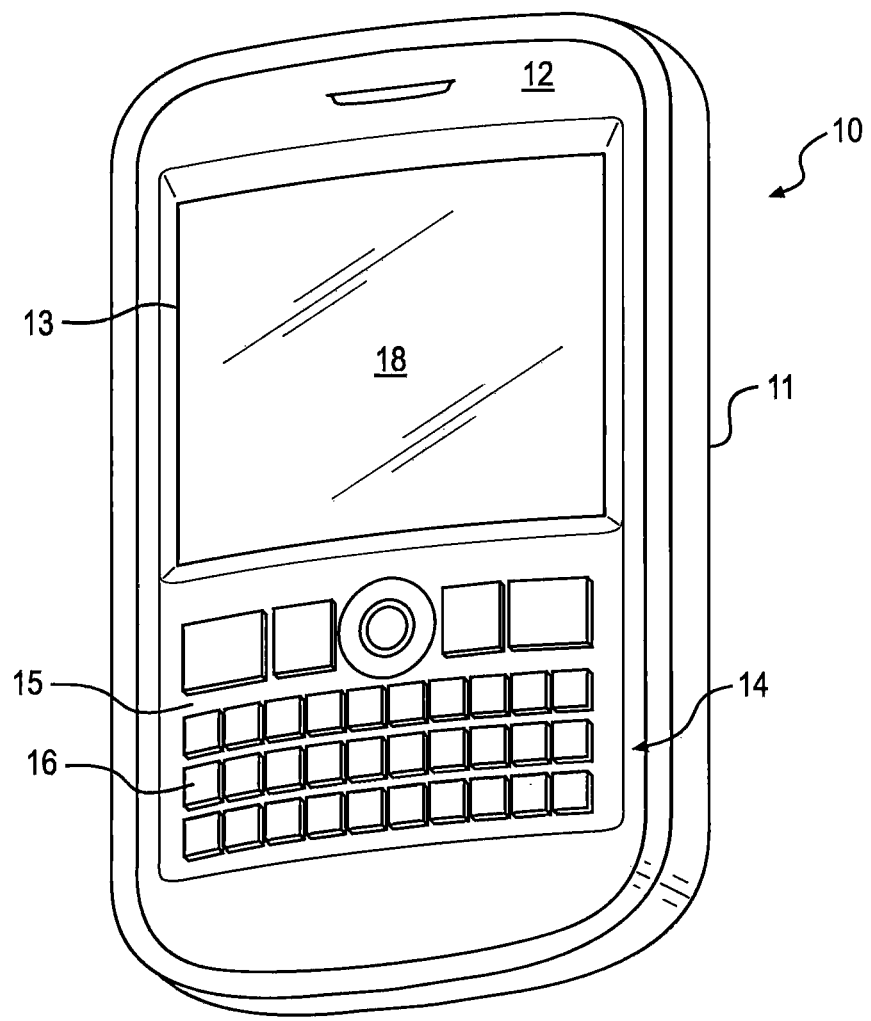
FIG. 2 is a perspective top view of a handheld electronic device having the input portion in a second position, consistent with disclosed embodiments.

An exemplary handheld electronic device is illustrated generally in FIGS. 1 and 2. As shown in FIGS. 1 and 2, handheld electronic device 10 has a rigid form factor such as, for example, a bar or brick form factor. That is, handheld electronic device 10 has an exterior with a length dimension, a width dimension, and a height dimension that are fixed so that the exterior dimensions of handheld electronic device 10 are constant.

As illustrated in FIG. 1, handheld electronic device 10 includes a housing 11, and a flexible display 13 and an input portion 14 supported by housing 11. Flexible display 13 includes a flexible organic light-emitting diode (OLED) display, a flexible e-ink display, a flexible liquid crystal display (LCD), or another type of flexible display. Flexible display 13 has a length dimension that is parallel to a length dimension of housing 11. In some embodiments, flexible display may be a touch screen display.

Input portion 14 is linked to flexible display 13. In the illustrated embodiment depicted in FIG. 2, a largest dimension of input portion 14 is parallel to a width dimension of housing 11. It should be understood, however, that in some embodiments, input portion 14 may be arranged such that a largest dimension of input portion 14 is parallel to a length dimension of housing 11. Input portion 14 has a user interface surface 15 which includes one or more input devices 16. Examples of such input devices 16 include, for example, a keyboard, keypad, touchpad, gamepad, or a track ball, or any other type of input device.

As will be discussed in more detail in each of the exemplary embodiments discussed below, input portion 14 is advantageously movable between a plurality of positions. For instance, input portion 14 can move between a first position illustrated in FIG. 1 and a second position illustrated in FIG. 2. Input portion 14 and flexible display 13 are linked so that, when the input portion 14 is moved from the first position to the second position, flexible display 13 is rearranged and the viewable area of the flexible display 13 is reduced, and vice-versa.

More particularly, when input portion 14 is in the first position shown in FIG. 1, a substantial portion of interface surface 15 of input portion 14 is inaccessible to a user of handheld electronic device 10. In the second position shown in FIG. 2, however, a substantial portion of user interface surface 15 is parallel to a front face 12 of device 10. In this manner, input devices 16 disposed on user interface surface 15 are operable by the user of the handheld electronic device 10.

When input portion 14 is in the first position illustrated in FIG. 1, a substantial portion of flexible display 13 is parallel to the front face 12 of device 10 to define a first viewing area 17. A length dimension of first viewing area 17 substantially corresponds to a length dimension of housing 11. When input portion 14 is in the second position illustrated in FIG. 2, however, flexible display 13 is rearranged to define a second viewing area 18 that is smaller than the first viewing area 17.

Referring to FIGS. 3A-3D, a handheld electronic device 100 in accordance with a first embodiment will be described. Handheld electronic device 100 includes a housing 110, an input portion 140, and a flexible display 130 associated with housing 110. Input portion 140 includes a user interlace surface 150 having one or more input devices 160. While the user interface surface 150 of the depicted embodiment includes a keypad, it is contemplated that user interface surface 150 can include one or more other input devices 160 known to one of ordinary skill in the art.

Flexible display 130 and input portion 140 are arranged with respect to housing 110 so as to permit translating movement of flexible display 130 and input portion 140 in a direction parallel to a length dimension of housing 110. An end 135 of flexible display 130 is linked to input portion 140. Accordingly, when input portion 140 is translated, e.g., by the user placing one or more fingers on input portion 140 and manually moving input portion 140 relative to housing 110 in a direction parallel to the length dimension of housing 110, input portion 140 and flexible display 130 translate together in the direction parallel to the length dimension of housing 110. Input portion 140 and flexible display 130 slide on tracks 195 formed in housing 110. It is contemplated, however, that input portion 140 and flexible display 130 may slide within a groove defined by housing 110 or may be guided in their movement relative to housing 110 by any other structural arrangement known to one of ordinary skill in the art.

In this embodiment, housing 110 includes a first recess 190a and a second recess 190b disposed in an interior of housing 110. First recess 190a and second recess 190b are configured to receive a portion of input portion 140 and a portion of flexible display 130, respectively.

Figure 3A:
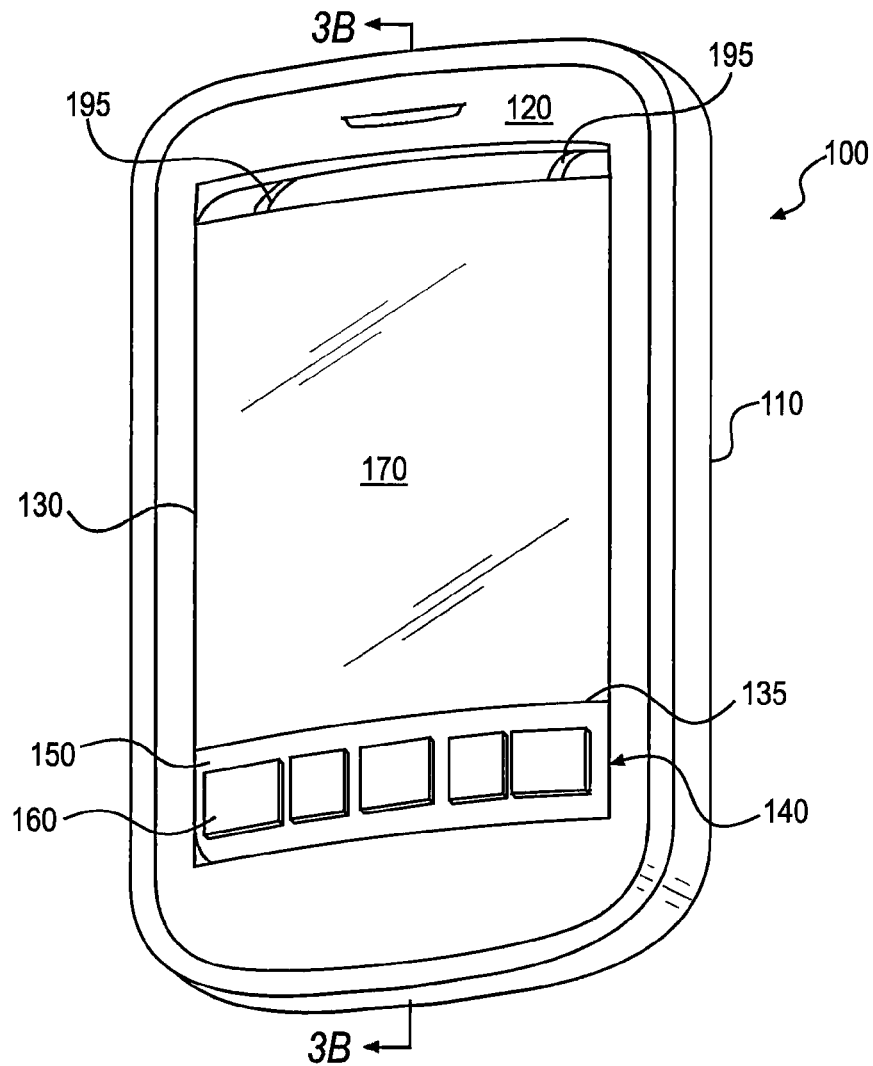
FIG. 3A is a perspective top view of a handheld electronic device having an input portion in a first position, according to a first exemplary embodiment.
Figure 3B:
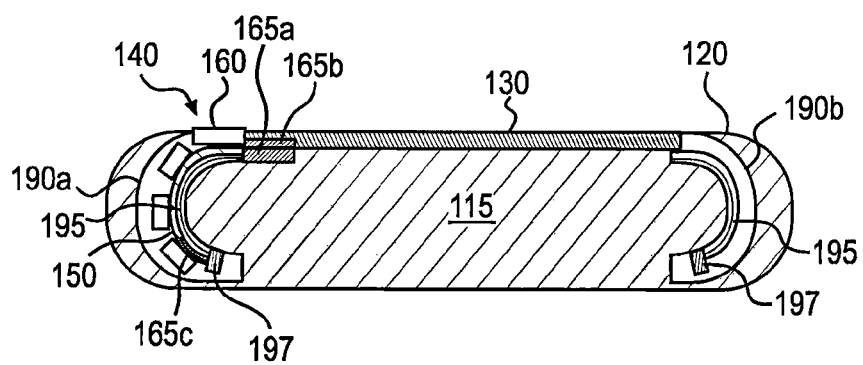
FIG. 3B is a partially schematic cross-sectional view taken along plane 3B-3B of FIG. 3A.

As illustrated in FIGS. 3A and 3B, a substantial portion of flexible display 130 is parallel to a front face 120 of device 100 to define a first viewing area 170. In some examples, a length dimension of first viewing area 170 substantially corresponds to the length dimension of housing 110. When a substantial portion of flexible display 130 extends across front face 120 of device 100, a substantial portion of input portion 140 is placed within first recess 190a of housing 110.

Figure 3C:
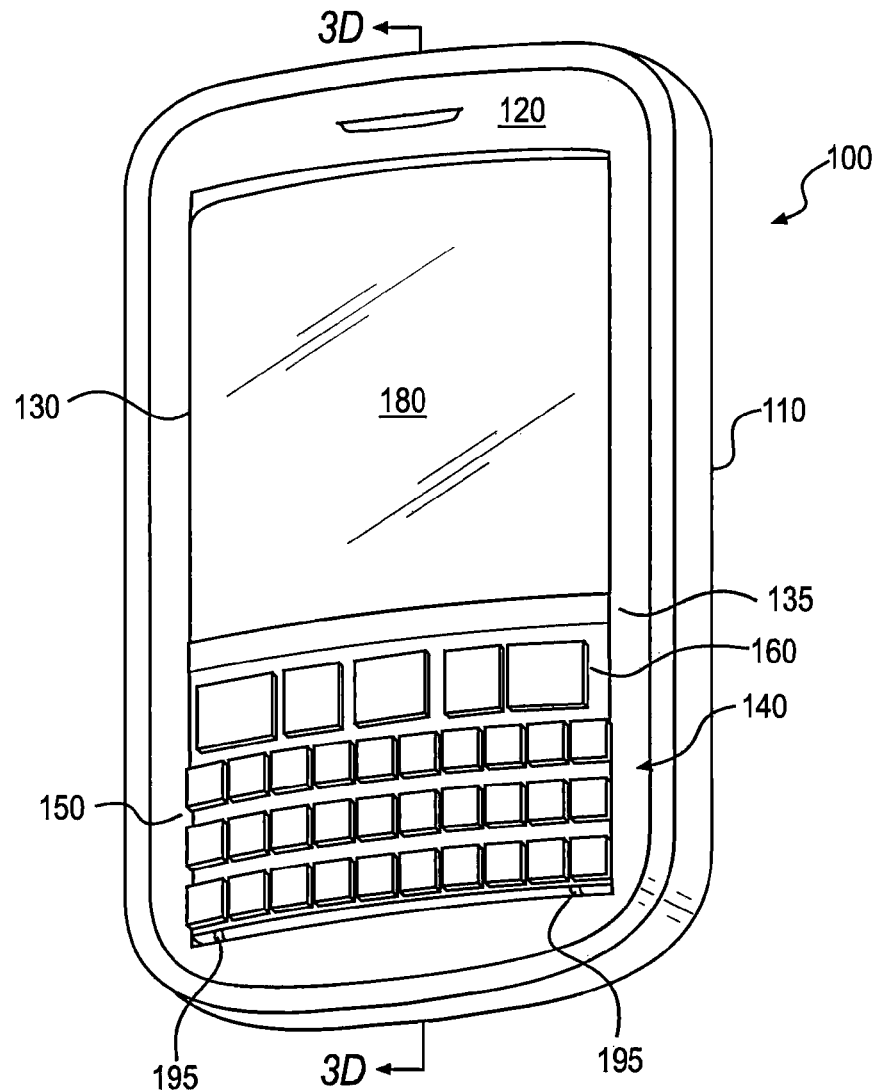
FIG. 3C is a perspective top view of a handheld electronic device having the input portion in a second position, according to the first exemplary embodiment.
Figure 3D:
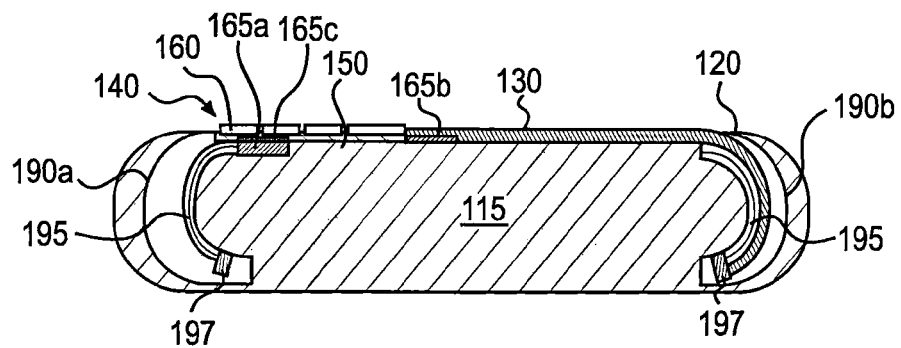
FIG. 3D is a partially schematic cross-sectional view taken along plane 3D-3D of FIG. 3C.

FIGS. 3C and 3D depict input portion 140 in a second position, in which a substantial portion of user interface surface 150 of input portion 140 is parallel to front face 120 of device 100. As illustrated in FIG. 3C, flexible display 130 defines a second viewing area 180 that is less than the first viewing area 170. When a substantial portion of user interface surface 150 of input portion 140 extends across front face 120 of device 100, a substantial portion of flexible display 130 is placed within second recess 190b of housing 110.

Handheld electronic device 100 includes a retainer arrangement configured to releasably retain input portion 140 in the first position (FIGS. 3A and 3B) and in the second position (FIGS. 3C and 3D), respectively. Many retainer arrangements of handheld electronic devices are known to one of ordinary skill in the art and will not be described in detail herein. Any suitable arrangement may be used. In one example, the retainer arrangement includes a first magnet 165b and a second magnet 165c that are configured to magnetically couple flexible display 130 and input portion 140, respectively, to a magnet 165a disposed in interior housing 115 when input portion 140 is in the first position (FIGS. 3A and 3B) and in the second position (FIGS. 3C and 3D). Magnets 165a, 165b, 165c releasably retain input portion 140 and flexible display 130 with respect to housing 110, when input portion 140 is in either the first position (FIGS. 3A and 3B) or the second position (FIGS. 3C and 3D). In addition, the tracks 195 in housing 110 that guide movement of input portion 140 and flexible display 130 with respect to housing 110, includes stops or limits 197 that prevent movement of input portion 140 beyond the first position (FIGS. 3A and 3B) or the second position (FIGS. 3C and 3D) after being moved from one position to another.

When a user of the electronic handheld device 100 manually engages either input portion 140 or flexible display 130 and pushes it in a direction parallel to the length dimension of housing 110 with a sufficient force, input portion 140 is moved from the first position (FIGS. 3A and 3B) or the second position (FIGS. 3C and 3D) so that both input portion 140 and flexible display 130 slide relative to front face 120 of housing 110. In translating input portion 140 from the first position (FIGS. 3A and 3B) to the second position (FIGS. 3C and 3D), flexible display 130 is displaced into second recess 190b in housing 110.

While the exemplary embodiment of FIGS. 3A-3D has an input portion 140 that is movable between a first position in which a substantial portion of input portion 140 is retracted within first recess 190a of housing 110 and a second position in which user interface surface 150 is substantially parallel to front face 120 of device 100, input portion 140 may assume a plurality of positions therebetween. For example, input portion 140 may assume a third position in which input portion 140 is partially retracted into first recess 190a in the interior of housing 110. When input portion 140 is in the third position, flexible display 130 may be partially retracted within second recess 190b in the interior of housing 110 and define a third viewing area that is less than first viewing area 170 and greater than the second viewing area 180 (not shown).

Figure 4A:
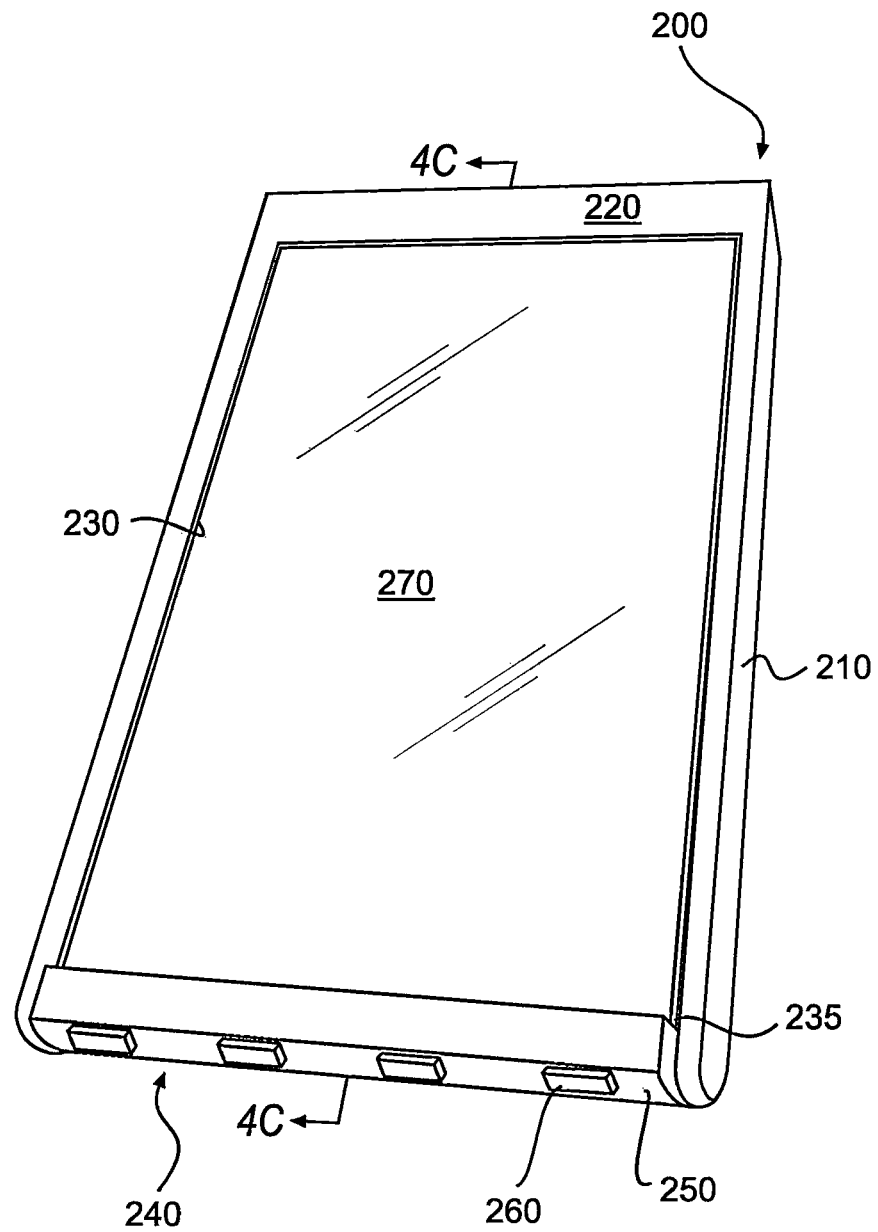
FIG. 4A is a perspective top view of a handheld electronic device having the input portion in a first position, according to a second exemplary embodiment.
Figure 4B:
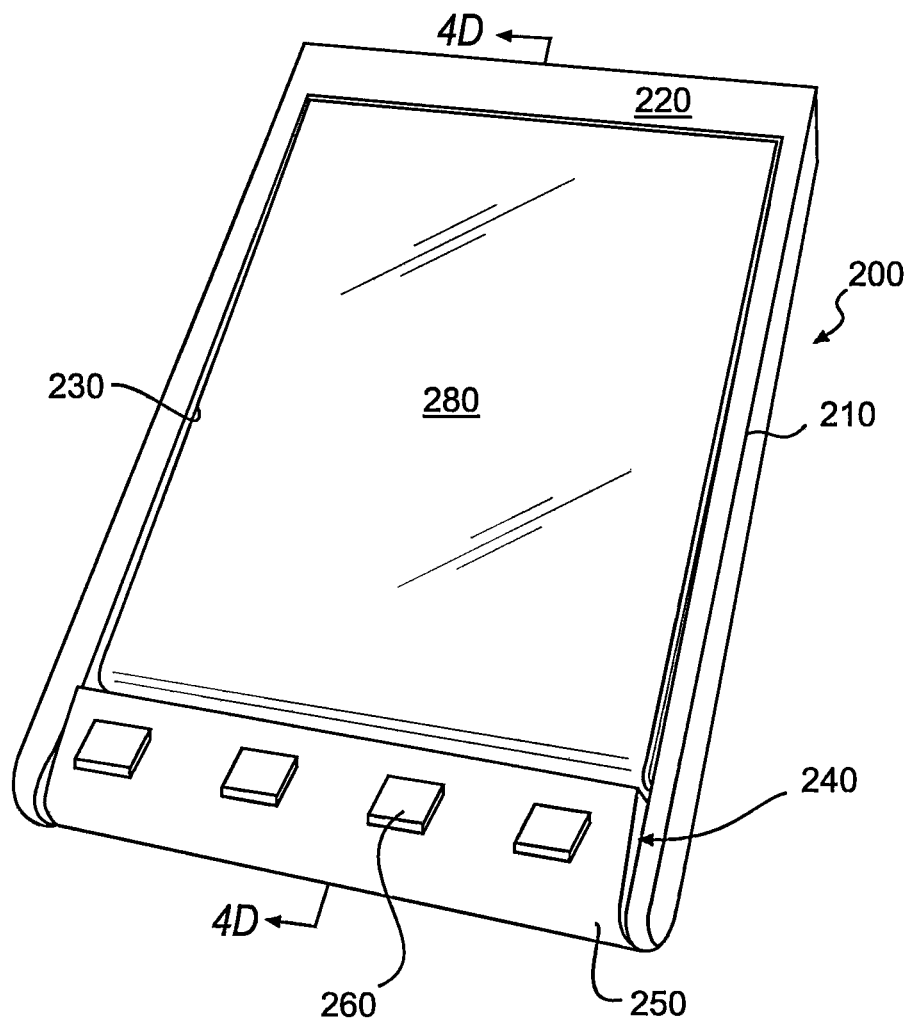
FIG. 4B is a perspective top view of a handheld electronic device having the input portion in a second position, according to the second exemplary embodiment.
Figure 4C:
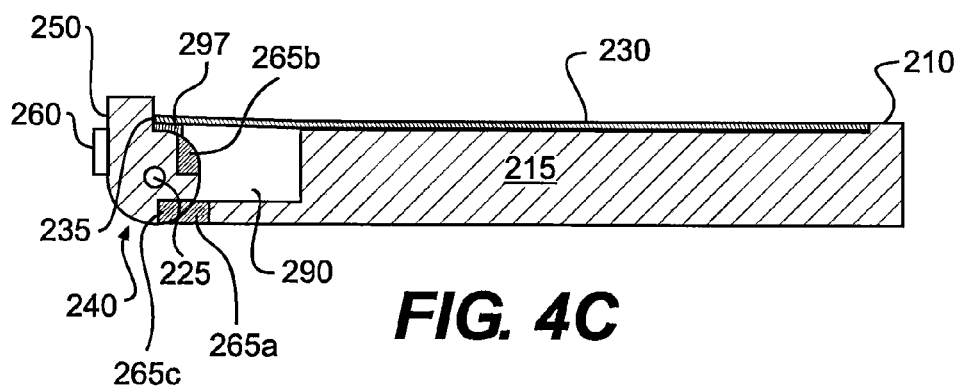
FIG. 4C is a partially schematic cross-sectional view taken along plane 4C-4C of FIG. 4A.

Referring to FIGS. 4A-4C, a handheld electronic device 200 in accordance with a second embodiment will be described. Handheld electronic device 200 includes a housing 210, and an input portion 240 and a flexible display 230 associated with housing 210. Input portion 240 is located at one end of housing 210 and includes a user interface surface 250 having one or more input devices 260. It is contemplated that flexible display 230 may be a touch screen and the one or more input devices 260 may be navigations buttons.

Figure 4D:
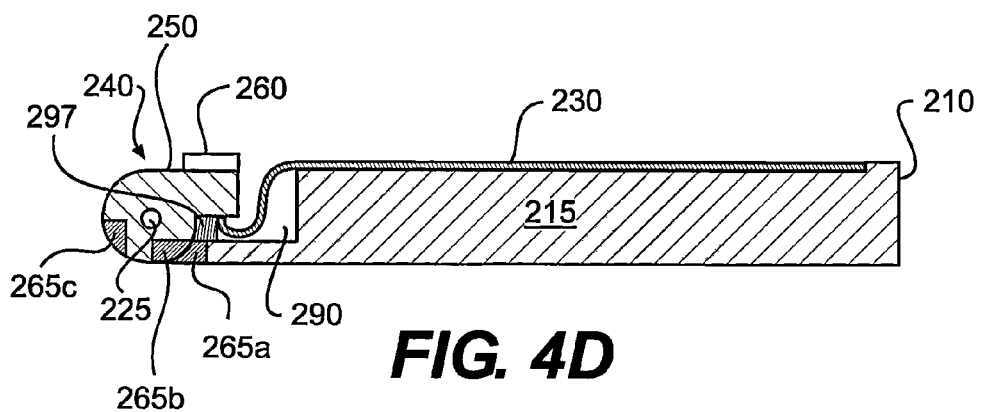
FIG. 4D is a partially schematic cross-sectional view taken along plane 4D-4D of FIG. 4B.

In this embodiment, input portion 240 is mounted to rotate relative to housing 210 between a first position shown in FIGS. 4A and 4C, and a second position shown in FIGS. 4B and 4D. In the first position shown in FIGS. 4A and 4C, user interface surface 250 of input portion 240 is perpendicular to a front face 220 of device 200. In the second position shown in FIGS. 4B and 4D, user interface area 250 is parallel to front face 220 of device 200 and disposed on front face 220 of device 200.

When input portion 240 is in the first position, a substantial portion of flexible display 230 is parallel to front face 220 of device 200 to define a first viewing area 270. When input portion 240 is in the second position shown in FIG. 4B, flexible display 230 defines a second viewing area 280 that is smaller than the first viewing area 270.

Referring to FIGS. 4C-4D, an end of flexible display 230 is linked to input portion 240. When a user of handheld electronic device 200 manually engages input portion 240 and applies a sufficient force, input portion 240 rotates from the first position illustrated in FIGS. 4A and 4C to the second position illustrated in FIGS. 4B and 4D, and a portion of flexible display 230 is displaced into a recess 290 in an interior 215 of housing 210. In this manner, flexible display 230 moves from the first arrangement illustrated in FIG. 4A to the second arrangement illustrated in FIG. 4B.

A suitable rotating arrangement allows input portion 240 to rotate, relative to housing 210, between the first position illustrated in FIGS. 4A and 4C and the second position illustrated in FIGS. 4B and 4D. In one example, the rotating arrangement includes a pin 225 projecting from opposite sides of input portion 240 and extending into similarly sized openings (not shown) in housing 210. Any suitable alternative arrangement may be used.

Handheld electronic device 200 also includes a retainer arrangement configured to releasably retain input portion 240 in the first position (illustrated in FIGS. 4A and 4C) and in the second position (illustrated in FIGS. 4B and 4D), respectively. Many retainer arrangements of handheld electronic devices are known to one of ordinary skill in the art and will not be described in detail herein. Any suitable arrangement may be used. In one example, the retainer arrangement includes a first magnet 265b and a second magnet 265c that are configured to magnetically couple input portion 240 to a magnet 265a disposed in interior 215 of housing 210 when input portion 240 is in the first position (FIGS. 4A and 4C) and in the second position (FIGS. 4B and 4D). In addition, a stop or limit 297 is provided on input portion 240 to prevent rotation of input portion 240 beyond the second position after being moved from the first position to the second position. In some examples, a similar stop or limit (not shown) is provided to prevent input portion 240 from rotating beyond the first position after being moved from the second position to the first position.

Referring to FIGS. 5A-5E, a handheld electronic device 300 in accordance with a third embodiment will be described. Handheld electronic device 300 includes a housing 310, and an input portion 340 and a flexible display 330 associated with housing 310. Input portion 340 includes a user interface surface 350 having one or more input devices 360. It is contemplated that the one or more input devices 360 may include navigation keys and/or a keypad.

Figure 5A:
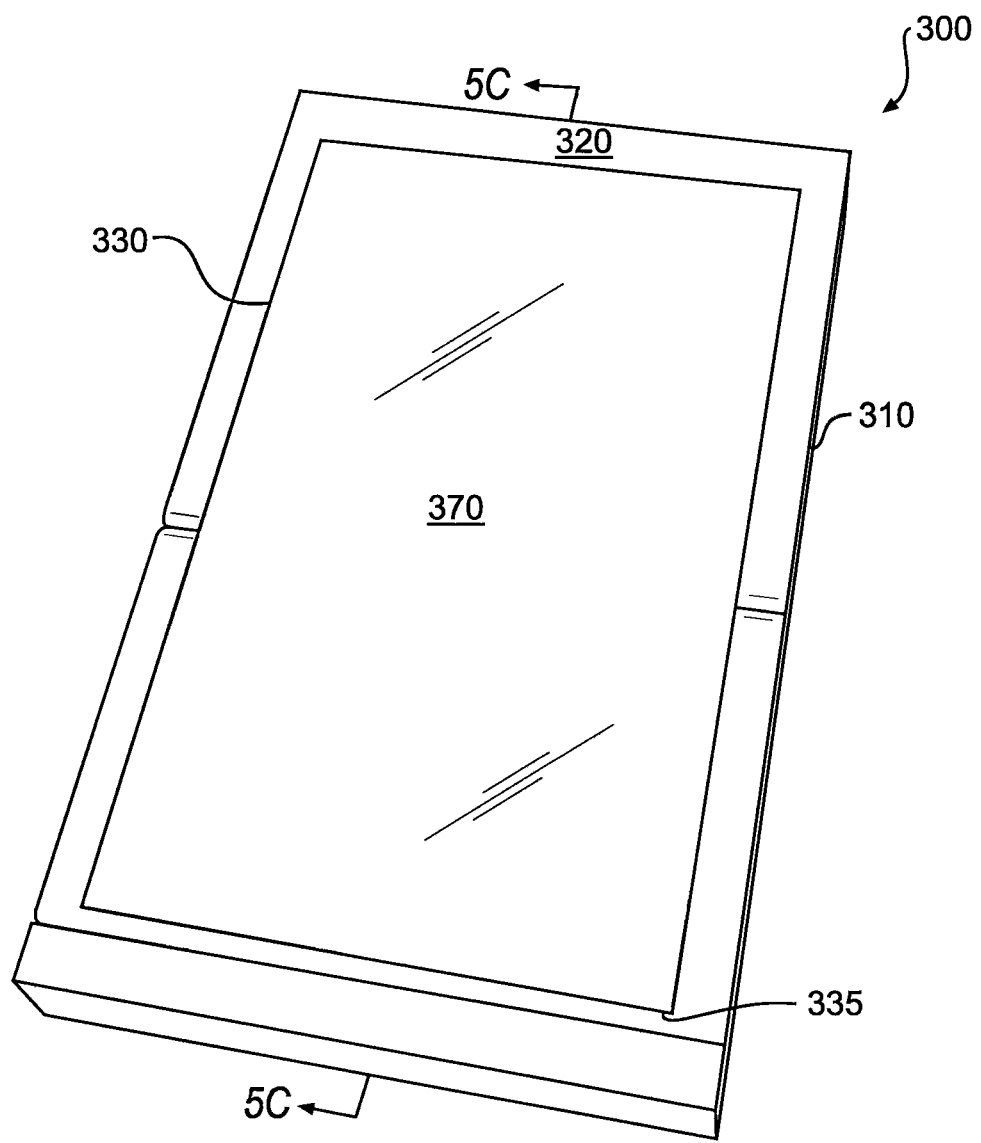
FIG. 5A is a perspective top view of a handheld electronic device having the input portion in a first position, according to a third exemplary embodiment.
Figure 5B:
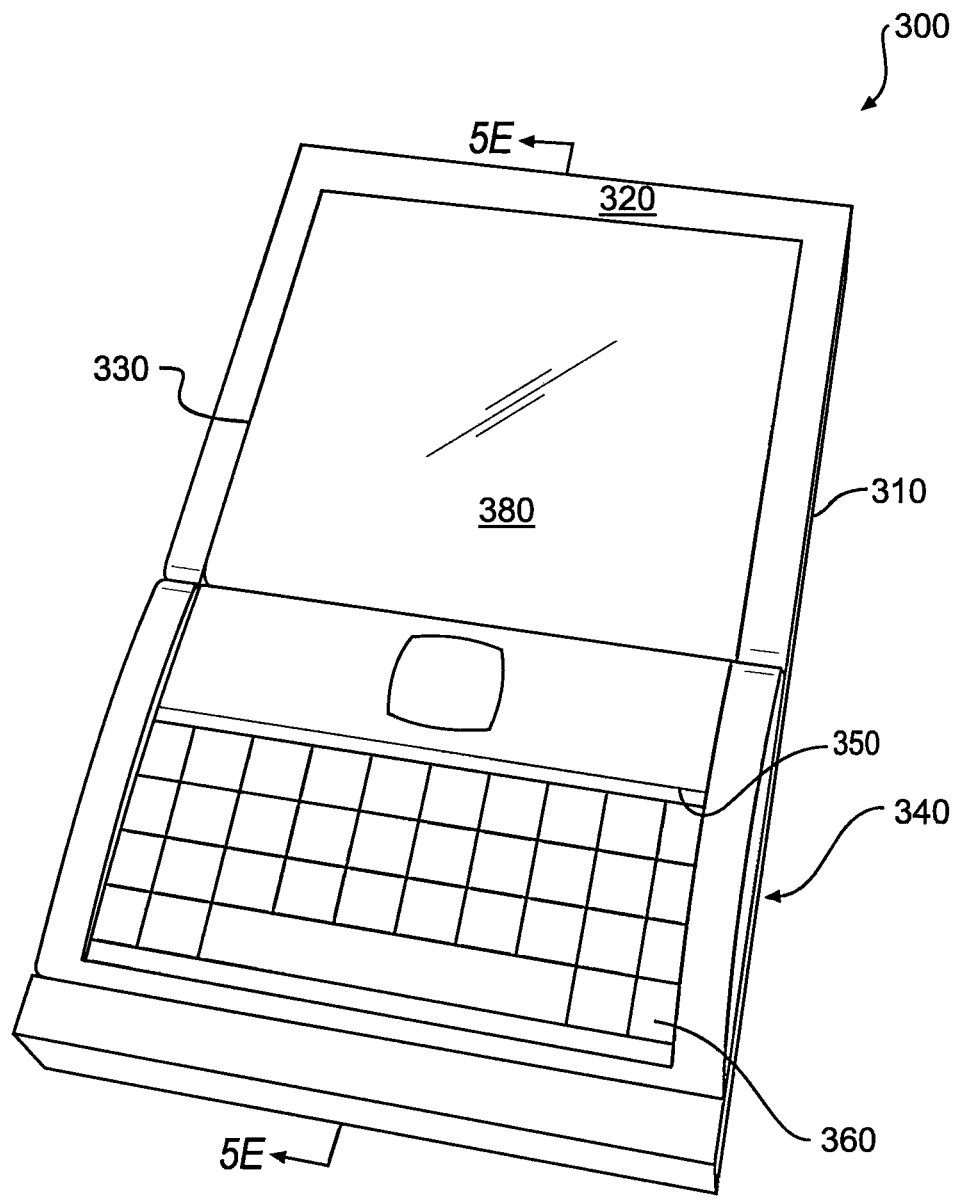
FIG. 5B is a perspective top view of a handheld electronic device having an input portion in a second position, according to the third exemplary embodiment.
Figure 5C:
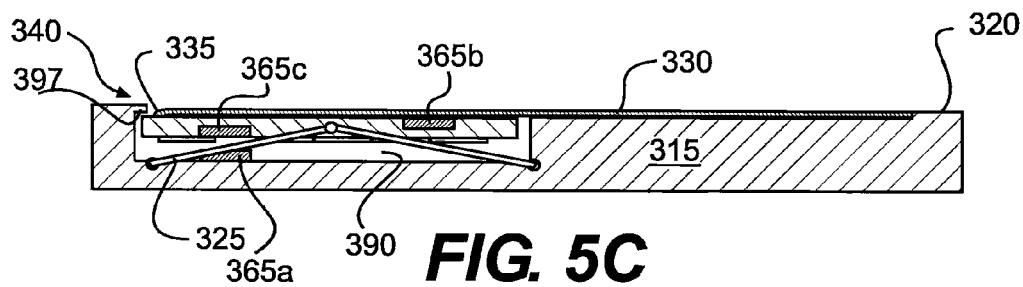
FIG. 5C is a partially schematic cross-sectional view taken along plane 5C-5C of FIG. 5A.
Figure 5D:
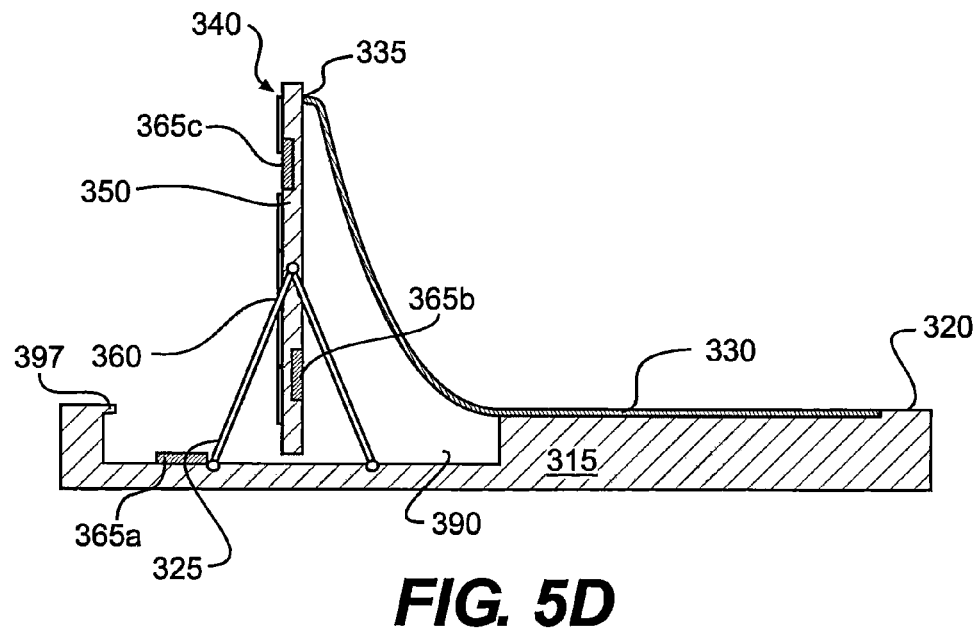
FIG. 5D is a partially schematic cross-sectional view similar to that of FIG. 5A, showing the input portion intermediate to the first and second positions.
Figure 5E:
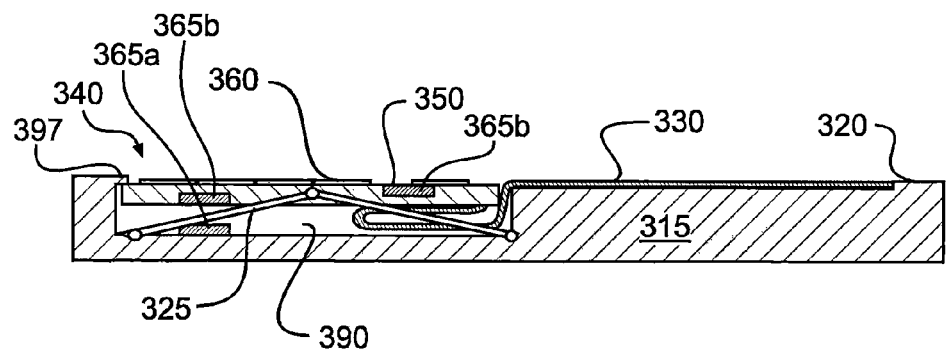
FIG. 5E is a partially schematic cross-sectional view taken along plane 5E-5E of FIG. 5B.

In this embodiment, input portion 340 is mounted to rotate relative to housing 310 between a first position shown in FIGS. 5A and 5C, and a second position shown in FIGS. 5B and 5E. In the first position shown in FIGS. 5A and 5C, user interface surface 350 of input portion 340 is disposed in a recess 390 facing an interior 315 of housing 310. In the second position shown in FIGS. 5B and 5E, user interface area 350 of input portion 340 is substantially parallel to front face 320 of device 300 and disposed on front face 320 of device 300.

When input portion 340 is in the first position, a substantial portion of flexible display 330 is parallel to front face 320 of device 300 to define a first viewing area 370. When input portion 340 is in the second position shown in FIGS. 5B and 5E, flexible display 330 defines a second viewing area 380 that is smaller than the first viewing area 370.

Referring to FIGS. 5C-5E, an end of flexible display 330 is linked to input portion 340. Additionally, housing 310 includes a coupling movement mechanism 325 attached to input portion 340. Coupling movement mechanism 325 allows input portion 340 to pivot 180° relative to housing 310 between the first position illustrated in FIGS. 5A and 5C and the second position illustrated in FIGS. 5B and 5E. Many coupling movement mechanisms of handheld electronic devices are known to one of ordinary skill in the art and will not be described in detail herein. Any suitable mechanism may be used. In one example, coupling movement mechanism 325 may be a linkage mechanism including multiple gears (e.g., seven).

Handheld electronic device 300 also includes a retainer arrangement configured to releasably retain input portion 340 in the first position (FIGS. 4A and 4C) and in the second position (FIGS. 4B and 4D). Many retainer arrangements of handheld electronic devices are known to one of ordinary skill in the art and will not be described in detail herein. Any suitable arrangement may be used. In one example, input portion 340 includes one or more magnets 365b and 365c that are configured to magnetically couple input portion 340 to one or more magnets 365a disposed in recess 390 of housing 310 when input portion 340 is in the first position (FIGS. 5A and 5C) and in the second position (FIGS. 5B and 5D). In addition, coupling movement mechanism 325 includes a stop or limit 397 in the form of a releasable catch that movably extends into recess 390 and releasably engages input portion 340 thereby preventing movement of input portion 340 beyond the first position or the second position after being moved from one position to the other position.

When a user of handheld electronic device 300 manually engages input portion 340 and applies a sufficient force, input portion 340 rotates from the first position illustrated in FIGS. 5A and 5C to the second position illustrated in FIGS. 5B and 5E, and a portion of flexible display 330 is displaced into the recess 390 in the interior 315 of housing 310. In this manner, flexible display 330 moves from the first arrangement illustrated in FIGS. 5A and 5C to the second arrangement illustrated in FIGS. 5B and 5E.

The embodiments shown in the drawings allow users of the electronic handheld devices to select a desired flexible display area or a desired user interface surface without altering the overall dimensions of the handheld electronic device. In this manner, the handheld electronic devices are versatile while maintaining a small form factor.

While specific embodiments have been described in detail, it will be appreciated by those skilled in the art that various modifications and alternatives to those details could be developed in light of the overall teachings of the disclosure. Accordingly, the particular arrangements disclosed are meant to be illustrative only and not limiting.

What is claimed is:
1. A handheld electronic device, comprising:
a housing;
a flexible display; and
an input portion linked to the flexible display, wherein the input portion and the flexible display are configured to move relative to the housing to provide a first arrangement of the flexible display in which a substantial portion of the flexible display is parallel to a front face of the handheld electronic device and a second arrangement of the flexible display in which a portion of the flexible display is disposed within a recess in an interior of the housing, wherein the flexible display has a first viewing area in the first arrangement and a second viewing area in the second arrangement, wherein the second viewing area is less than the first viewing area, and wherein exterior length, width, and height dimensions of the handheld electronic device are the same when the flexible display is in the first arrangement and the second arrangement.

2. The handheld device of claim 1, wherein a length dimension of the first viewing area substantially corresponds to a length dimension of the housing.

3. The handheld electronic device of claim 1, wherein the input portion defines a user interface surface that includes one or more input devices.

4. The handheld electronic device of claim 3, wherein the device is configured such that, when the flexible display is disposed within the recess in the interior of the housing, a substantial portion of the user interface surface of the input portion is disposed on the front face of the handheld electronic device.

5. The handheld electronic device of claim 1, wherein the input portion is configured to move between a first position and a second position to translate the display between the first arrangement and the second arrangement.

* * * * *